United States Patent
Davis

(10) Patent No.: US 10,625,120 B2
(45) Date of Patent: Apr. 21, 2020

(54) FACILITATION OF INTERACTIVE EXERCISE SYSTEM

(71) Applicant: Braxton K. Davis, Atlanta, GA (US)

(72) Inventor: Braxton K. Davis, Atlanta, GA (US)

( * ) Notice: Subject to any disclaimer, the term of this patent is extended or adjusted under 35 U.S.C. 154(b) by 44 days.

(21) Appl. No.: 15/340,966

(22) Filed: Nov. 1, 2016

(65) Prior Publication Data

US 2018/0117418 A1 May 3, 2018

(51) Int. Cl.
| | |
|---|---|
| *A63B 24/00* | (2006.01) |
| *H04W 8/20* | (2009.01) |
| *H04W 4/12* | (2009.01) |
| *A63B 71/06* | (2006.01) |
| *A63B 21/078* | (2006.01) |
| *A63B 21/072* | (2006.01) |
| *H04W 84/18* | (2009.01) |
| *H04W 8/00* | (2009.01) |

(52) U.S. Cl.
CPC ........ *A63B 24/0087* (2013.01); *A63B 21/078* (2013.01); *A63B 21/0724* (2013.01); *A63B 71/0622* (2013.01); *H04W 4/12* (2013.01); *H04W 8/20* (2013.01); *A63B 2024/0093* (2013.01); *A63B 2071/0625* (2013.01); *A63B 2220/40* (2013.01); *A63B 2220/803* (2013.01); *A63B 2225/50* (2013.01); *A63B 2230/75* (2013.01); *H04W 8/005* (2013.01); *H04W 84/18* (2013.01)

(58) Field of Classification Search
CPC ......... H04W 4/12; H04W 8/20; H04W 84/18; A63B 24/0087; A63B 2024/0093; A63B 71/0622; A63B 2220/40; A63B 2230/75; A63B 2071/0625; A63B 2225/50; A63B 2220/803
See application file for complete search history.

(56) References Cited

U.S. PATENT DOCUMENTS

| | | | |
|---|---|---|---|
| 9,381,399 B2* | 7/2016 | Adel | A63B 24/0062 |
| 2006/0189440 A1* | 8/2006 | Gravagne | A63B 24/00 482/8 |
| 2007/0219059 A1* | 9/2007 | Schwartz | A61B 5/0205 482/8 |
| 2008/0071794 A1* | 3/2008 | Barnard | A63B 24/0062 |
| 2008/0242509 A1* | 10/2008 | Menektchiev | A63B 21/0552 482/4 |
| 2010/0056341 A1* | 3/2010 | Ellis | A61B 5/1038 482/9 |
| 2010/0057848 A1* | 3/2010 | Mangold | G06F 19/3481 709/203 |
| 2011/0172497 A1* | 7/2011 | Ruby | A61B 5/7264 600/300 |
| 2014/0207264 A1* | 7/2014 | Quy | A61B 5/6838 700/91 |

(Continued)

*Primary Examiner* — Sundhara M Ganesan
(74) *Attorney, Agent, or Firm* — Braxton K. Davis

(57) ABSTRACT

A more efficient exercise system can be facilitated by interactive components. The interactive components can communication with mobile devices, users, server devices, weight lifting machines, etc. The interactive components can also generate exercise data and provide prompts to a user to facilitate a more efficient workout. Additionally, third-parties can receive user workout data and manipulate exercise equipment remotely to assist a user in attaining his or her goals.

19 Claims, 12 Drawing Sheets

(56) References Cited

U.S. PATENT DOCUMENTS

| | | | |
|---|---|---|---|
| 2014/0240122 A1* | 8/2014 | Roberts | A61B 5/4809 340/539.11 |
| 2016/0074707 A1* | 3/2016 | Thorpe | G09B 19/0092 434/127 |
| 2017/0308663 A1* | 10/2017 | Moya | A61B 5/6898 |
| 2018/0014755 A1* | 1/2018 | Alessandri | A61B 5/1118 |
| 2018/0050234 A1* | 2/2018 | Kashyap | A63B 24/0062 |

\* cited by examiner

FACILITATION OF INTERACTIVE EXERCISE SYSTEM

TECHNICAL FIELD

This disclosure relates generally to exercise metric-based device. More specifically, this disclosure relates to facilitating adjustment of exercise equipment based on exercise metrics transmitted via an interactive exercise system.

BACKGROUND

Weight lifting and personal fitness is a growing industry, and there is an increased effort for individuals to be more health conscious. However, at times, it can be difficult to maintain a consistent workout regimen. Although the daily variables of life can negatively alter a person's workout regimen, inconsistent tracking of progress can also negatively affect a person's workout regimen. Consistent tracking of exercise progress can positively influence a person's health, recovery, physical therapy, insurance premiums, and confidence.

The above-described background relating to facilitation of an interactive exercise system is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
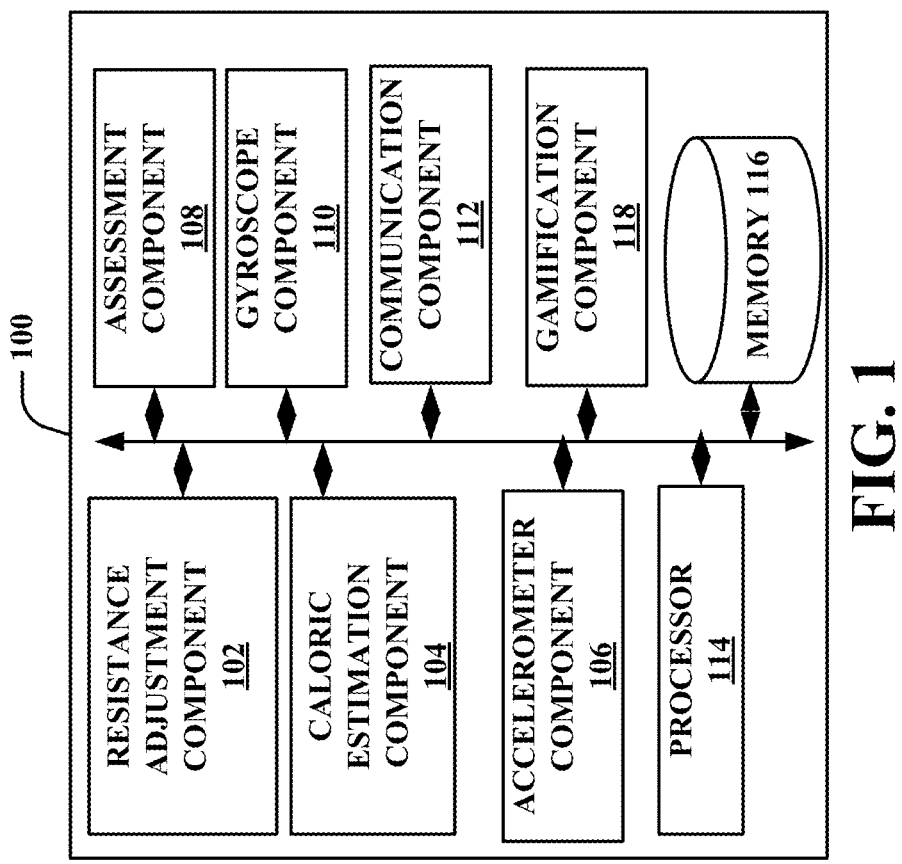
FIG. 1 illustrates an example exercise metric device according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a seamless handoff of communication between mobile devices, exercise metric devices, exercise equipment, and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), ZigBee, or another IEEE 802.XX technology. Additionally, substantially all aspects disclosed herein can be exploited in legacy telecommunication technologies.

Described herein are systems, methods, articles of manufacture, and other embodiments or implementations that can facilitate interactive exercise equipment. Facilitating interactive exercise equipment can be implemented in connection with any type of device with a connection to the communications network such as: a smart watch, a laptop, a handheld device, a desktop computer, a television, an Internet enabled television, a mobile phone, a smartphone, a tablet user computer (PC), a digital assistant (PDA), a heads up display (HUD), a virtual reality (VR) headset, an augmented reality (AR) headset, another type of wearable computing device, etc.

As fitness and fitness trends increase, systems, methods, and devices can be employed to assist in the fitness and personal development of individuals. Coordinated tracking and output of fitness data can result in refined fitness programs specific to the individual and their fitness needs. This disclosure details an exercise metric device and a system for tracking and disseminating fitness metrics associated with individuals and groups of individuals. It should be noted that functionality between the exercise metric device and the system can be interchangeable based on the various scenarios discussed herein.

The exercise metric device can procure and generate data in conjunction with exercise equipment. Furthermore, the exercise metric device can be a part of a system comprising servers, mobile devices, other exercise metric devices, cloud-based storage, etc. The number of times a weight or pulley (e.g., barbell, free weight, stationary weight machine, etc.) is lifted can be detected and/or calculated and specific outputs can be generated in accordance with the detected and/or calculated data. This can help standardize workout regimens and produce better fitness results. Generally when an individual works out, they either have to remember what they did previously or write it down so that they can pick up where they left off upon their next workout session. Consequently, someone who does a variety of different workouts can lose track of how many repetitions they performed and at what weight and/or resistance level they performed the repetitions. Additionally, it can be cumbersome for someone to keep track of this data by writing it down or storing it in their mobile device.

The exercise metric device can store and/or generate exercise metrics associated with the exercise equipment including, but not limited to: weight data, resistance data, motion data, repetition data, time data, etc. The exercise metric device can also communicate with any other wireless network device via Bluetooth, iBeacon (or similar technology), cellular, zig-bee, and/or any other wireless communications standard. It should be understood that the exercise metric device can be separate and distinct from the exercise equipment or the exercise metric device can be built into the exercise equipment. Although the exercise metric device can be separate and distinct from the exercise equipment, it should also be understood that in certain embodiments the exercise metric device can be attached to the exercise equipment. It should also be noted that the exercise metric device can wirelessly communicate with the exercise equipment when it is separate an distinct from the exercise equipment. In one embodiment, the exercise metric device can generate exercise metrics as a person is exercising. For instance, weight data and repetition data of a user who is bench pressing can be generated to indicate that the user bench pressed one hundred thirty-five pounds, ten times, within twenty seconds.

Additionally, the exercise metric device can receive inputs (e.g., caloric consumption, sleep time, age, weight, gender, height, ethnic background, nutrition, hydration, etc.) from a mobile device and/or a server device to facilitate generation of biometric data including, but not limited to: caloric expenditure, heart rate, pulse etc.). The inputs can also be stored within a user profile (user identity) of a user, on a server device provided in a data center having multiple servers (e.g., a single rack of servers to hundreds or thousands of servers) or a laptop computer, and/or a cloud-based system, wherein the user can access and update the user profile from an application on a mobile device. Alternatively, the user profile can be stored locally on the mobile device. The inputs, in conjunction with exercise metrics generated and/or received by the exercise metric device can be used to generate additional fitness metrics to assist in a user's fitness regimen. For instance, based on an input of user's weight, resistance, and repetition data generated by the exercise metric device, the exercise metric device can generate an approximate caloric expenditure of the user during their workout session. It should be noted that the additional fitness metrics (e.g., date, time, location, duration, efficiency, progress, etc.) can be generated by the exercise metric device and sent to a mobile device and/or the additional fitness metrics can be generated by a server and/or the mobile device after receiving the exercise metrics from the exercise metric device.

In another embodiment, the additional fitness metrics can be generated at a remote server that can receive exercise metrics from the exercise metric device and/or profile data from the user profile. The additional fitness metrics can provide the user with additional goals and instructions regarding their fitness regimen. For example, if the server device receives user profile data and exercise metric data from the exercise metric device that indicates that the user has expended three hundred calories, the server device can generate nutritional and/or nourishment data representative of a meal or liquids that the user should consume to maximize the affect of the workout. This can then be sent to the user's mobile device and/or application on the mobile device for access by the user.

The exercise metric device can send exercise metrics to a user's mobile device and a remote server for access by another user and/or a group of users. It should be noted that the exercise metric device can send all of the exercise metric data to a server, where the exercise metric data can be pulled down to mobile devices. A third party who receives the exercise metric data can be a personal trainer, a physician, a physical therapist, a health insurance company, or the like. Upon accessing the exercise metrics, the other user can analyze and input goal data to communicate specific goals for a user's current workout session and/or a future workout session. For example, based on exercise metric data, which indicates that the user lifted one hundred thirty-five pounds ten times, the personal trainer can provide a goal, via the system, for the user to lift one hundred forty-five pounds ten times in real-time and/or for the future. The system can also generate goal data and disseminate it to the user's mobile device in real-time and/or for the future. The goal data can be based on user inputs, third party inputs, (personal trainer, physical therapist, healthcare company, etc.) an algorithm, etc. Additionally, the system and/or the third-party can prompt the user to perform certain exercises, set or adjust the weight and/or resistance on the exercise equipment, and/or create a workout regimen for the user to follow.

For example, the system can prompt the user to go to the twenty-five pound dumbbells to perform three sets on each arm, next go to the bench press to perform three sets of bench pressing one hundred thirty-five pounds, and then go to the lateral pull-down machine to perform three sets of lateral pull-downs at one hundred fifty-five pounds. Additionally, the user can input (via his/her mobile device) a goal to increase his/her pectoral muscles by twenty percent within two months, and the system can automatically generate an exercise regimen, over a two-month span, for the user based on his/her goals. Alternatively, a third-party can generate the exercise regimen and provide it for access by the user's mobile device and/or the exercise metric device. The exercise regimen can comprise detailed instructions on what exercises to perform on specific days and times as well as what nutrition the user will require based on the aforementioned received inputs. The user prompts can be displayed on the user's mobile device and/or transmitted audibly to the user from the mobile device.

It should be noted that the system can also provide limited data to nearby mobile devices based on a current user's workout session. Since the exercise metric device and/or the system can know the details of the user's exercise plan, the exercise metric device and/or the system can keep track of where the user is within his/her workout plan. For instance, if a user has received an audible indication to perform three sets of one hundred thirty-five pounds on the lateral pull-down machine at ten repetitions a piece, and the user begins performing this exercise, the exercise metric device and/or the system can determine where the user is within the workout (e.g., on the $5^{th}$ repetition of the second set), an approximate end time, and/or generate approximate end time data. The approximate end time can also be based on an average that the user has attained by using the exercise metric device in conjunction with the lateral pull-down machine over a period of time. Therefore, the exercise metric device and/or the system can send time and/or approximation data to nearby mobile devices to indicate to nearby patrons when the lateral pull-down machine should be available for use by them after the approximated end time.

Based on this data, the exercise metric device and/or the system can accept a reservation for next use from a nearby patron that received the time and/or approximation data. Additionally, the exercise metric device and/or the system can generate wait times for a first user to rest in between sets and/or generate wait times to allow a second user to work in with the first user. For example, the system can generate an audible message to be sent to the user's mobile device to alert the user to rest sixty seconds before beginning his next set of repetitions on the lateral pull-down machine. During that same sixty seconds, the system can send audible data to the user's workout partner to begin his workout, which should take less than sixty seconds, while the user is resting, thereby increasing workout efficiency for both the user and the user's workout partner. This type of interplay can be generated by a partner mode, which can be selected on the user's mobile device and/or the user's partner's mobile device. Individual modes and group modes (as discussed later with regards to gamification) can also be selected to determine the type of workout a user would like to facilitate.

In a further embodiment, the system can help user's to locate a potential workout partner. For instance, if a first user selects a locate partner mode, then his/her mobile device can locate a second user who has also selected the locate partner mode. Additionally, the system can present the first user with a list of other users who have selected partner mode. Within the locate partner mode, physical fitness biographies, biographical data, exercise regimens, strength, endurance, body type, etc. can be displayed so that the first user can select a partner to workout with that is similarly suited. For instance, if the first user wants to work on pectoral muscles, triceps, and biceps today, then the system might return other users who want to work on at least some of those muscle groups to prompt a match. Consequently, if both users agree to proceed, then they can be prompted by their respective mobile devices to workout together leveraging the partner mode interplay as noted above. The system can make suggestions and/or randomly select a workout partner based on data that shows some type of commonality between users. The agreement to proceed is important so that a user who can bench press between two hundred to two hundred and fifty pounds is not inadvertently paired with another user who can only bench press one hundred pounds. If these two users were paired together, then they would have to rack and un-rack the weights for each set to accommodate each user, which can result in an inefficient workout.

Alternatively, the first user and/or the system might select a second user based on a training-type platform. For instance, the first user might want to have larger calf muscles, so the system can scan for other users who have strong calf muscles and ask the other users if he/she would be willing to train the first user.

In another embodiment, it should be noted that a user's workout plan can be altered by the availability of certain machines. For example, a first user's workout plan may have him perform a set of lateral pull-downs, a set of chest bench press, and a set of curls using dumbbells in that specific order. However, when the first user walks into the gym, a second user is currently using the lateral pull-down machine and there is an approximate estimated ten minute wait time until the second user will complete his workout on the lateral pull-down machine. Consequently, because the system recognizes that the first user will have to wait ten minutes before beginning his workout, the system can check to see if any of the other exercise stations are available (e.g., the bench press, dumbbells) and then direct the first user to the bench press to begin his workout instead of waiting an additional 10 minutes. The system can also take into consideration whether the first user's workout might be less efficient or productive based on the reordering of the exercises to be performed. For example if performing the bench press prior to the lateral pull-down is counter-productive, then the system might suggest that the first user begin with the dumbbells, then the lateral pull-down, and then the bench press to avoid the overall ten minute wait. It should also be noted that exercise metric devices attached to various exercise machines can form a network of exercise metric devices that can communicate with each other to generate usage data and assist in redirecting users accordingly.

The exercise metric device can control the resistance or weight to be lifted for exercise machines. Based on user inputs (e.g., third-party inputs such as from a personal trainer, algorithms, etc.), the exercise metric device can be configured to adjust a weight and/or resistance associated with the exercise equipment. For instance, a personal trainer who is geographically remote to the exercise metric device can send an input (over a wireless network) to the exercise metric device to increase or decrease the weight of a lateral pull-down machine that the user is using or is about to use. Alternatively, the input can be sent to the mobile device of the user and communicated to the user via a text message or an audible signal. Accordingly, the user can then adjust the weight of the lateral pull-down himself. Consequently, when the repetition is completed by the user, completion data representative of the lateral pull-down exercise being completed can be generated by the exercise metric device and sent to the mobile device and/or the remote server for access by the personal trainer and/or another third-party.

The exercise metric device's wireless communication can leverage location-based services based on a defined distance. For instance, the exercise metric device of a lateral pull-down machine can be set to communicate with mobile devices within a defined distance/radius (e.g., 1 foot) or zone of the lateral pull-down machine. This can prevent the exercise metric device from communicating with other mobile devices that are not within the radius or zone of the lateral pull-down machine, thereby allowing the exercise metric device to generate metric data for the current user (within the zone) of the lateral pull-down machine. Additionally, by zoning the exercise metric device's wireless communication, the system can prevent the exercise metric device from prompting a user to do an exercise when the user is not within the zone of the exercise equipment. The zone can be defined by the exercise metric device's location and/or the exercise equipment location. Upon detection of a user's mobile device entering the zone, the system can also adjust the weight and/or resistance of a machine according to a defined value. The defined value can come from a third-party device, a preset value from the users mobile device, and/or based on a generalized workout regimen. For example, in response to a user's mobile device entering a zone associated with a leg press machine, the exercise metric device can facilitate adjusting the weight and/or resistance of the leg press machine to a value set by a trainer remotely.

In an additional embodiment, the profile of the user can be updated with each workout session and a network of users with user profiles can allow their respective profiles to be seen by the other users. A gamification component of the system can pit one group of users against another group of users, or a first user against a second user, by displaying the first user's exercise metric data to the second user, or group of users, and prompting the second user to exercise. For example, the system can send a notification to the mobile device of the second user saying, "The first user lifted one hundred thirty-five pounds today and burned three hundred calories, what did you do?" Additionally, the gamification component can determine if the group of users have all met their workout goals for the day and provide an indication to the group of users when they have met their goals or encourage group members to meet their goals if they have not worked out for the day. For example, the system can send a notification to mobile devices of the group of users saying, "Only three out of the five of you have gone to the gym today, when are the rest of you going?" The system can also specifically indicate which group members have not met their goals and allow the other group members to encourage them to meet their goals.

In certain instances, exercise machines can perform multiple exercises for a user. For instance, the leg adduction/abduction machine is one exercise machine that performs two different exercises. Leg adduction can exercise the inner thighs while leg abduction can exercise the outer thighs. Therefore the exercise metric device can be configured to determine which exercise is being performed and which exercise to generate and/or receive data for. Additionally, the system can adjust a user prompt to alert the user to perform leg adduction or perform leg abduction in accordance with a workout regimen and/or in accordance with a directive received from a third party such as a personal trainer.

It should also be noted that an artificial intelligence (AI) component can facilitate automating one or more features in accordance with the disclosed aspects. A memory and a processor as well as other components can include functionality with regard to the figures. The disclosed aspects in connection with the exercise metric device and/or the system can employ various AI-based schemes for carrying out various aspects thereof. For example, a process for detecting one or more trigger events, reducing a weight of an exercise equipment as a result of the one or more trigger events, and modifying one or more reported measurements, and so forth, can be facilitated with an example automatic classifier system and process. In another example, a process for penalizing one weight adjustment while preferring another weight adjustment can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis repetition and time) to prognose or infer an action that can be automatically performed. In the case of exercise equipment adjustment, for example, attributes can be a weight and a repetition and the classes can be calories expended and calories required.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying an exercise equipment weight, modifying an exercise equipment resistance, and so forth. The criteria can include, but is not limited to, predefined values, attenuation tables or other parameters, service provider preferences and/or policies, and so on.

In one embodiment, described herein is a method comprising generating resistance data associated with a resistance of an exercise equipment and generating motion data related to a motion of the exercise equipment. The method can also comprise generating repetition data related to a number of the motion of the exercise equipment and transmitting the resistance data, the motion data, and the repetition data to a mobile device, resulting in transmitting data.

According to another embodiment, a system can facilitate receiving an indication that a mobile device is within a defined range associated with an exercise equipment and accessing a first user identity associated with the mobile device. Additionally, the system can facilitate transmitting motion data related to a motion of the exercise equipment to the mobile device in response to the accessing the first user identity and transmitting repetition data related to a number of the motion of the exercise equipment, resulting in transmitted data.

According to yet another embodiment, described herein is a machine-readable storage medium that can perform the operations comprising receiving an indication that a mobile device is within a defined range of an exercise equipment. The machine-readable storage medium can also perform operations comprising receiving user identity data associated with a user identity related to the exercise equipment, wherein the user identity data comprises motion data related to a previous motion of the exercise equipment, and repetition data representing a number of the previous motion of the exercise equipment, and generating output signal data based on the motion data and the repetition data.

These and other embodiments or implementations are described in more detail below with reference to the drawings. Referring now to FIG. 1, illustrated is an example exercise metric device according to one or more embodiments. In various embodiments, the exercise metric device 100 can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

The exercise metric device 100 can comprise several components including a resistance adjustment component 102, a caloric estimation component 104, an accelerometer component 106, an assessment component 108, a gyroscope component 110, a communication component 112, a processor 114, a memory 116, and a gamification component 118. The exercise metric device 100 components can be operatively coupled to each other. Repetitive description of like elements employed in other embodiments described herein is omitted for sake of brevity.

The resistance adjustment component 102 can be configured to adjust a weight and/or resistance associated with the exercise equipment. The weight can be adjusted in response to a mobile device entering a zone associated with the exercise equipment. The weight can also be adjusted in response to a mobile device leaving the zone associated with the exercise equipment. The caloric estimation component 104 can be configured to approximate a caloric expenditure of a user of the exercise metric device 100. For instance, calories expended can be based on several factors including, but not limited to: the user's weight, the user's age, the user's body type, the user's height, the resistance of the machine, the repetitions performed by the user at a certain resistance, etc. The exercise metric device 100 can also comprise an accelerometer component 106 for measuring an acceleration associated with use of the exercise equipment. This can provide output data representing how quickly a user performs a set of motions (e.g., up and down motions during a bench press exercise).

An assessment component 108 can assess the exercise metric device 100 and exercise equipment usage and generate data accordingly. For instance, the assessment component 108 can assess the exercise metric device 100 as in use, resting, in communication with another device, etc. The assessment component 108 can also continually assess a user's progress by generating real-time or near real-time data for users during a workout session. The assessment component 108 can comprise sensors (e.g., thermal sensors, heart-rate sensors, biometric sensors, pulse sensors, etc.) for detecting physical characteristics of a user. Data generated from the sensors can then be wirelessly communicated with the user's mobile device and/or a server device via a wireless network. Additionally, the assessment component can assess a user's physicality to determine a specific workout plan. For example, based on a user's last workout on a specific exercise machine, the assessment component 108 can provide suggestions to the user based on predictive analysis. If a user can regularly bench two hundred pounds ten times and does not perform a bench press for several months, then the assessment component 108 can predict muscle atrophy based on the user's lapsed time in performing a bench press. For instance, in accordance with other user data inputs (e.g., weight, height, physic, etc.), the assessment component 108 can predict a ten percent muscle atrophy in the user's pectoral muscles based on a two month lapse in bench press exercises. Conversely, the user profile can allow the user to add additional data that can offset the assessment component's 108 prediction of muscle atrophy. For example, if the user was performing push-ups regularly throughout the two-month bench press lapse, then this could offset the predicted ten percent muscle atrophy to maybe only a three percent muscle atrophy.

The exercise metric device 100 can also comprise a gyroscope component 110 for measuring orientation of the exercise metric device 100. Measuring orientation of the exercise metric device 100 can generate exercise data associated with use of the exercise equipment. For example, the gyroscope component 110 can be used to determine the orientation of the exercise equipment relative to the exercise being performed, thereby determining whether the exercise equipment is in use, at rest, extended, protracted, retracted, contracted, up, down, etc. The gyroscope component 110 can also be used to determine the maximum and minimum ranges of motion of a user performing a particular exercise. Additionally, the gyroscope can be used to determine a user's ability to keep the exercise equipment stable. For example, based on the gyroscope's orientation during a bench press, user stability data can be generated that can indicate that the user's left arm is stronger than his right arm. Consequently, the user can reduce the bench press weight to accommodate his right arm and/or use this information to begin strengthening his right arm by isolating his right arm during other exercise sessions. The system can also suggest specific exercises for the user to isolate his right arm. This type of localized data regarding the user's strengths and weaknesses can prevent the user from straining or injuring himself. The communication component 112 can be configured to facilitate communication with mobile devices, server devices, other exercise metric devices, wireless network devices, telecommunications network devices, etc. The communication component 112 can use Wi-Fi, ZigBee, Bluetooth, iBeacon (or similar technology) etc. to facilitate communication with the aforementioned devices. A memory 116 and a processor 114 can comprise functionality with regard to the exercise metric device 100. Additionally, should communication between a mobile device and the exercise metric device 100 be interrupted (e.g., by a dropped cellular signal, mobile device battery death, etc.), the memory 116 can store any shared or generated data and/or send the data to a server device. Additionally, the next time that the mobile device is within range of the exercise metric device, the exercise metric device 100 can transmit any previously stored data to the mobile device via the communication component 112. The gamification component 118 can gamify the exercise metrics to generate exercise metric-based challenges to facilitate competition between individuals and/or a group of individuals.

Figure 2:
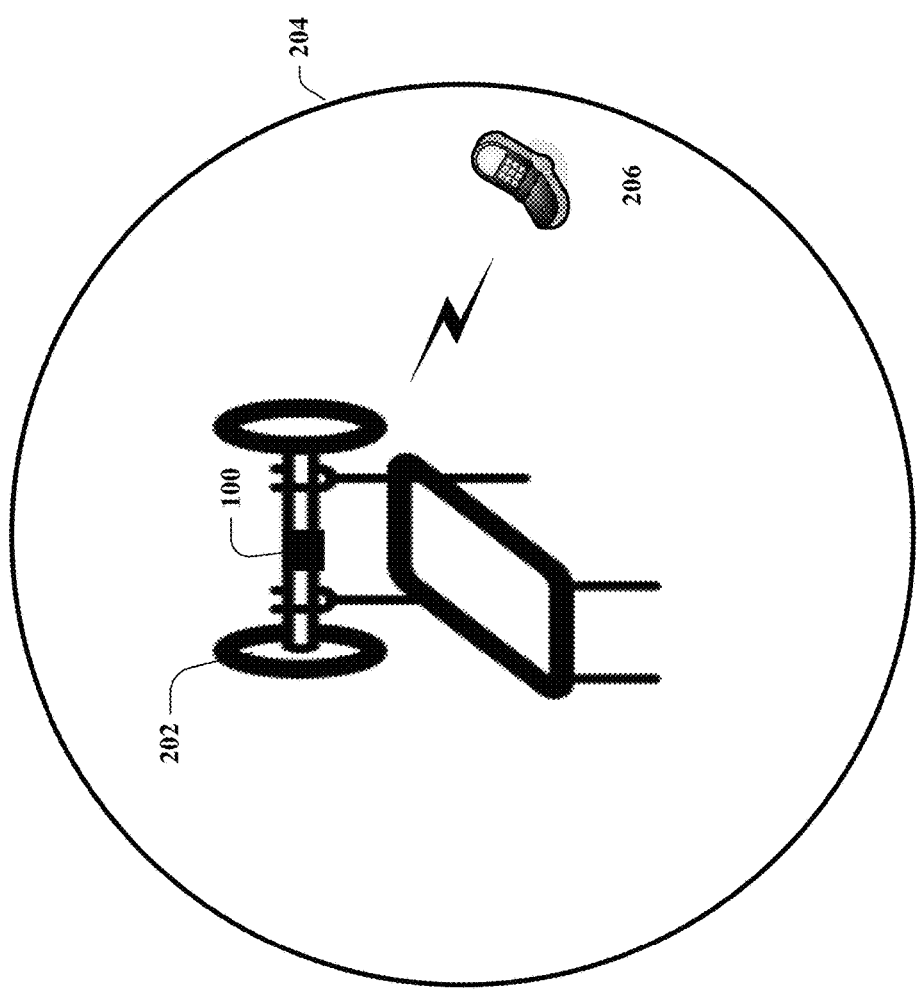
FIG. 2 illustrates an example exercise equipment comprising an exercise metric device in communication with a mobile device according to one or more embodiments.

Referring now to FIG. 2, illustrated is an example exercise equipment comprising an exercise metric device 100 in communication with a mobile device according to one or more embodiments. Repetitive description of like elements employed in other embodiments described herein is omitted for sake of brevity. The system 200 can comprise a free weight barbell 202. It should be noted that the exercise metric device 100 can be an add-on component to the free weight barbell 202 or the exercise metric device 100 can be built into the free weight barbell 202. In either scenario, the exercise metric device 100 can be associated with a zone 204 of communication. The zone 204 of communication can establish a distance of communication between the exercise metric device 100 and a mobile device 206 (e.g., via the communication component 112). It should be noted that the center of the radius or the zone 204 can be the exercise metric device 100 itself, or the center can be offset to align with the center of the exercise equipment, thereby generating an equidistant zone around the weight equipment even if the exercise metric device 100 is attached to a non-center location of the exercise equipment. It should be noted that the zone 204 does not have to be circular but could be any shape or configuration (rectangular, triangular, free-form, etc.) Essentially, the mobile device 206 can communicate with the exercise metric device within zone 204, but the mobile device 206 may not be able to communicate with the exercise metric device 100 outside of the zone 204 (e.g., via the communication component 112).

Figure 3:
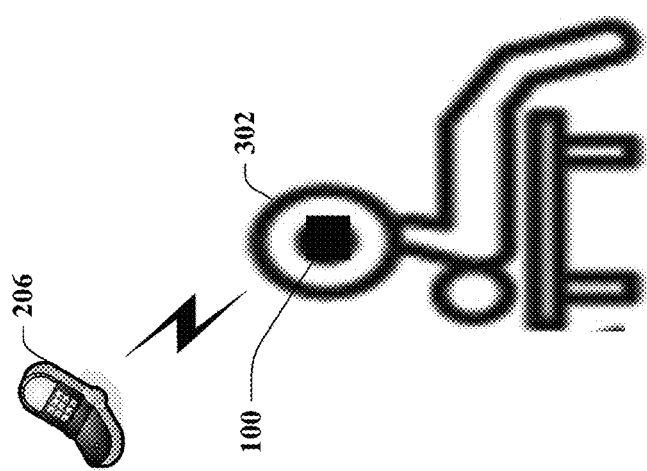
FIG. 3 illustrates an example exercise equipment comprising an exercise metric device in communication with a mobile device according to one or more embodiments.

Referring now to FIG. 3, illustrated is an example exercise equipment comprising an exercise metric device in communication with a mobile device according to one or more embodiments. Repetitive description of like elements employed in other embodiments described herein is omitted for sake of brevity. A free weight barbell 302 with an integrated exercise metric device can communicate with the mobile device 206 (e.g., via the communication component 112) in system 300. Communication between the mobile device 206 and the free weight barbell 302 can comprise exercise metrics associated with the user's workout performance. For instance, the exercise metrics can comprise weight and/or resistance data associated with the weight of the barbell and weight plates (e.g., via the assessment component 108), repetition data associated with a number of repetitions the user has completed (e.g., via the gyroscope component 110), and/or user caloric expenditure data (e.g., via the caloric estimation component) based on the weight and/or resistance data and repetition data.

Figure 4:
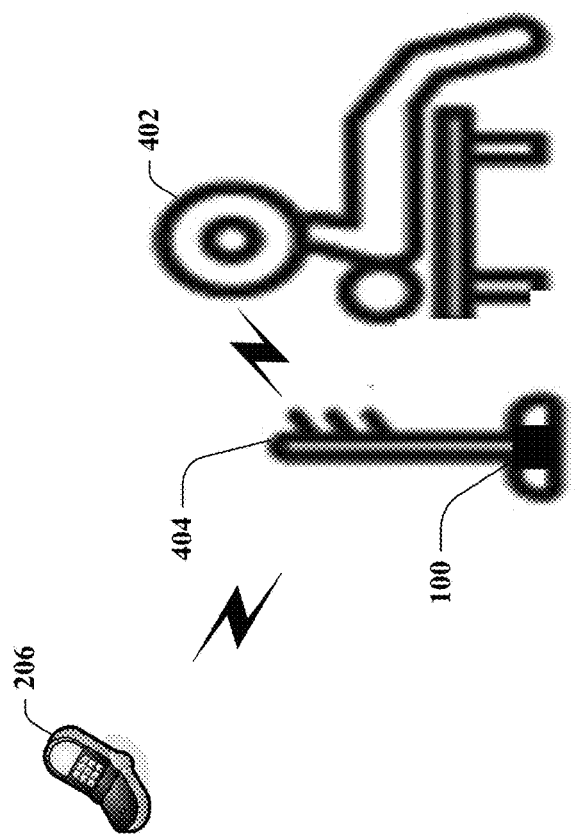
FIG. 4 illustrates an example first exercise equipment in communication with a second exercise equipment comprising an exercise metric device in communication with a mobile device according to one or more embodiments.

Referring now to FIG. 4, illustrated is an example first exercise equipment in communication with a second exercise equipment comprising an exercise metric device in communication with a mobile device according to one or more embodiments. Repetitive description of like elements employed in other embodiments described herein is omitted for sake of brevity. In another embodiment, a system 400 can comprise multiple exercise devices in communication with each other. For instance, the exercise metric device 100 can be integrated into the weight stand 404 as opposed to the barbell 402. However, the weight stand 404 can communicate with the barbell 402. Therefore, both the weight stand 404 and the barbell 402 can comprise wireless communication devices. For instance, the weight stand 404 and the barbell 402 can both comprise exercise metric devices 100 that can communicate with each other, which can allow the system 400 to determine when the barbell 402 is rested on the weight stand 404 or when the barbell 402 is in use by the user. Consequently, exercise metric data can be sent to the mobile device 206 via the weight stand 404 exercise metric device 100.

Figure 5:
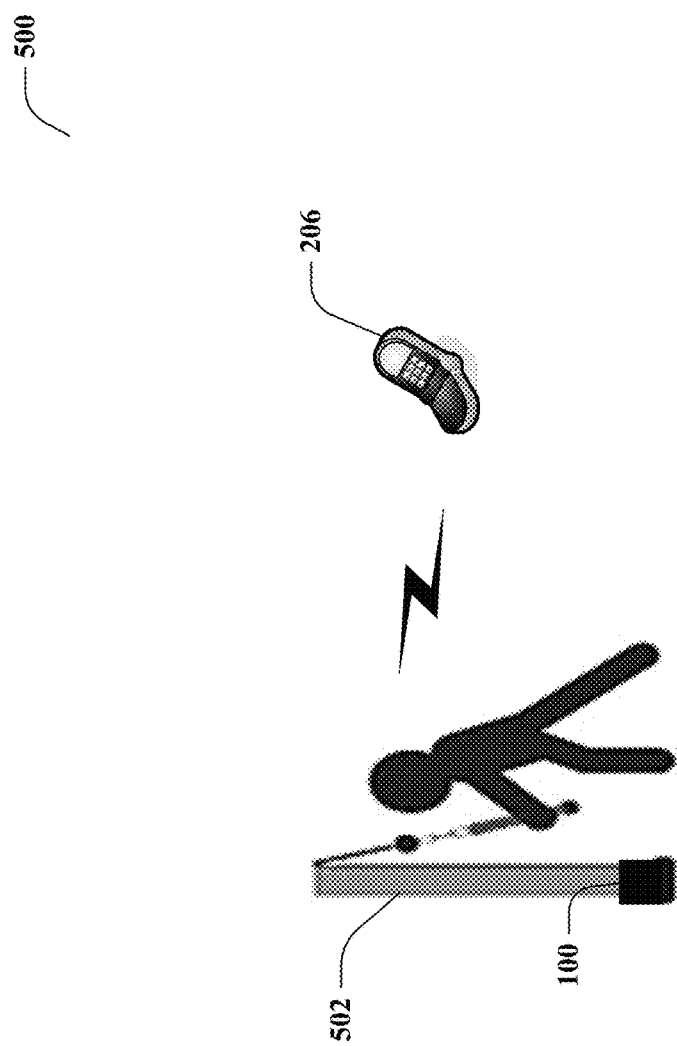
FIG. 5 illustrates an example exercise equipment comprising an exercise metric device in communication with a mobile device according to one or more embodiments.

Referring now to FIG. 5, illustrated is an example exercise equipment comprising an exercise metric device in communication with a mobile device according to one or more embodiments. Repetitive description of like elements employed in other embodiments described herein is omitted for sake of brevity. The system 500 can comprise a stationary machine 502 (e.g., cable & pulley, pectoral deck, calf, leg curl, etc.). The stationary machine 502 can comprise the exercise metric device 100, wherein the exercise metric device 100 is internal to the stationary machine 502, wherein the stationary machine 502 was built with (integrated) the exercise metric device 100, and/or wherein the exercise metric device 100 can be externally attached to the stationary machine 502. The exercise metric device 100 can communicate with the mobile device 206 of the user.

Figure 6:
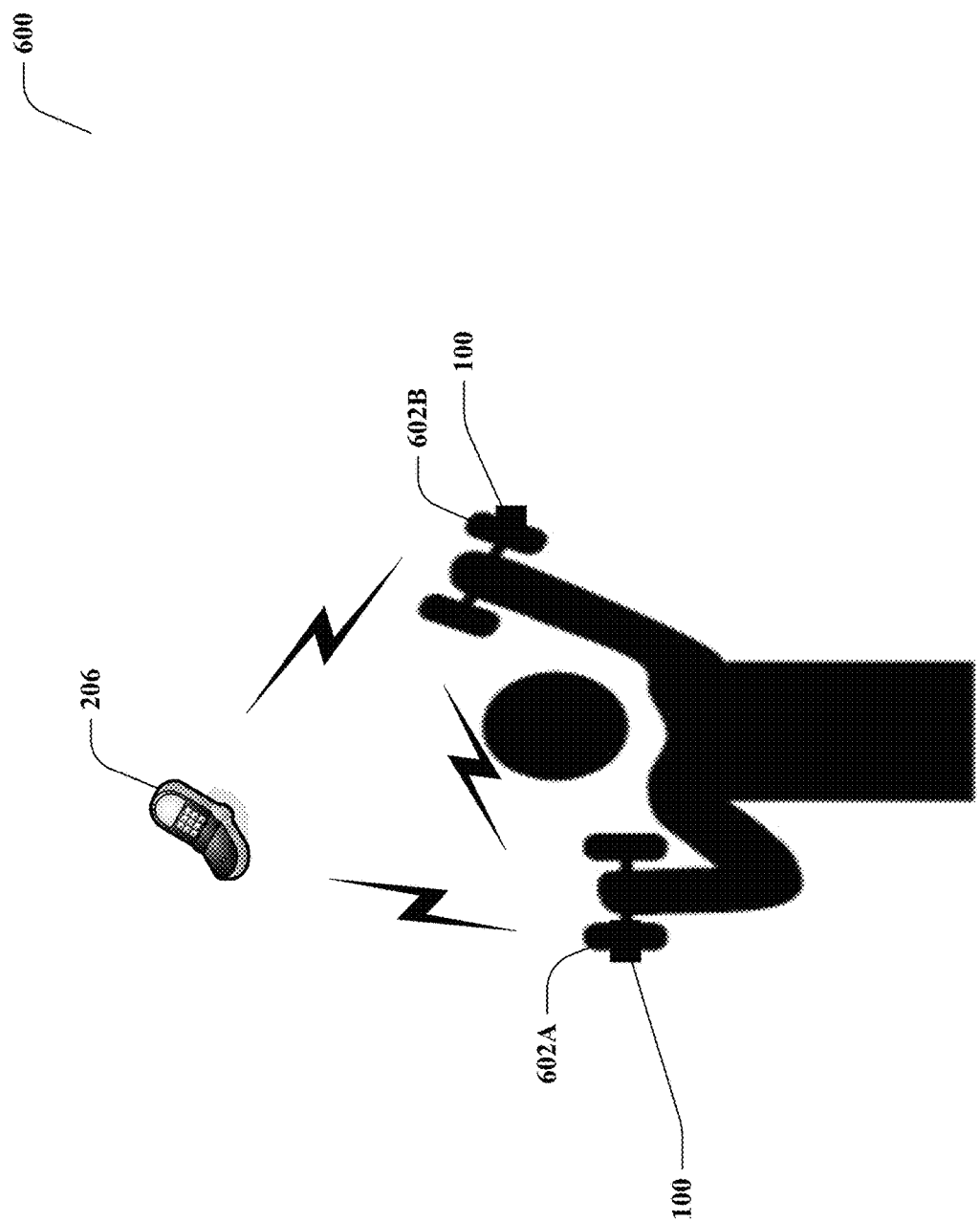
FIG. 6 illustrates an example exercise equipment comprising an exercise metric device in communication with a mobile device according to one or more embodiments.

Referring now to FIG. 6, illustrated is an example exercise equipment comprising an exercise metric device 100 in communication with a mobile device 206 according to one or more embodiments. Repetitive description of like elements employed in other embodiments described herein is omitted for sake of brevity. The system 600 can comprise free weights 602A, 602B (e.g., dumbbells, weight plates, etc.). In certain scenarios a user can use multiple exercise equipment simultaneously to facilitate his workout (e.g., using two dumbbells for simultaneous curls). Therefore, both free weights 602A, 602B can comprise an exercise metric device 100 to accurately capture exercise metrics. An exercise metric device 100 associated with free weight 602A can communicate (e.g., via the communication component 112) with another exercise metric device 100 associated with free weight 602B. This can allow the system 600 to infer that the free weights 602A, 602B are being used simultaneously by a single user. Additionally, multiple communication patterns are possible. For instance, the free weight 602A can communicate exercise metrics to the free weight 602B, which can then communicate the 602A exercise metrics and the free weight 602B exercise metrics (or vice versa) to the mobile device 206. Alternatively, both free weights 602A, 602B can communicate their respective exercise metrics simultaneously, or near simultaneously, to the mobile device 206. It should also be noted that the communication can be bi-directional, meaning that the mobile device 206 can also communicate with the free weights 602A, 602B in a similar manner as the free weights 602A, 602B communicate with the mobile device. Bi-direction communication can be true for all other embodiments as well.

Figure 7:
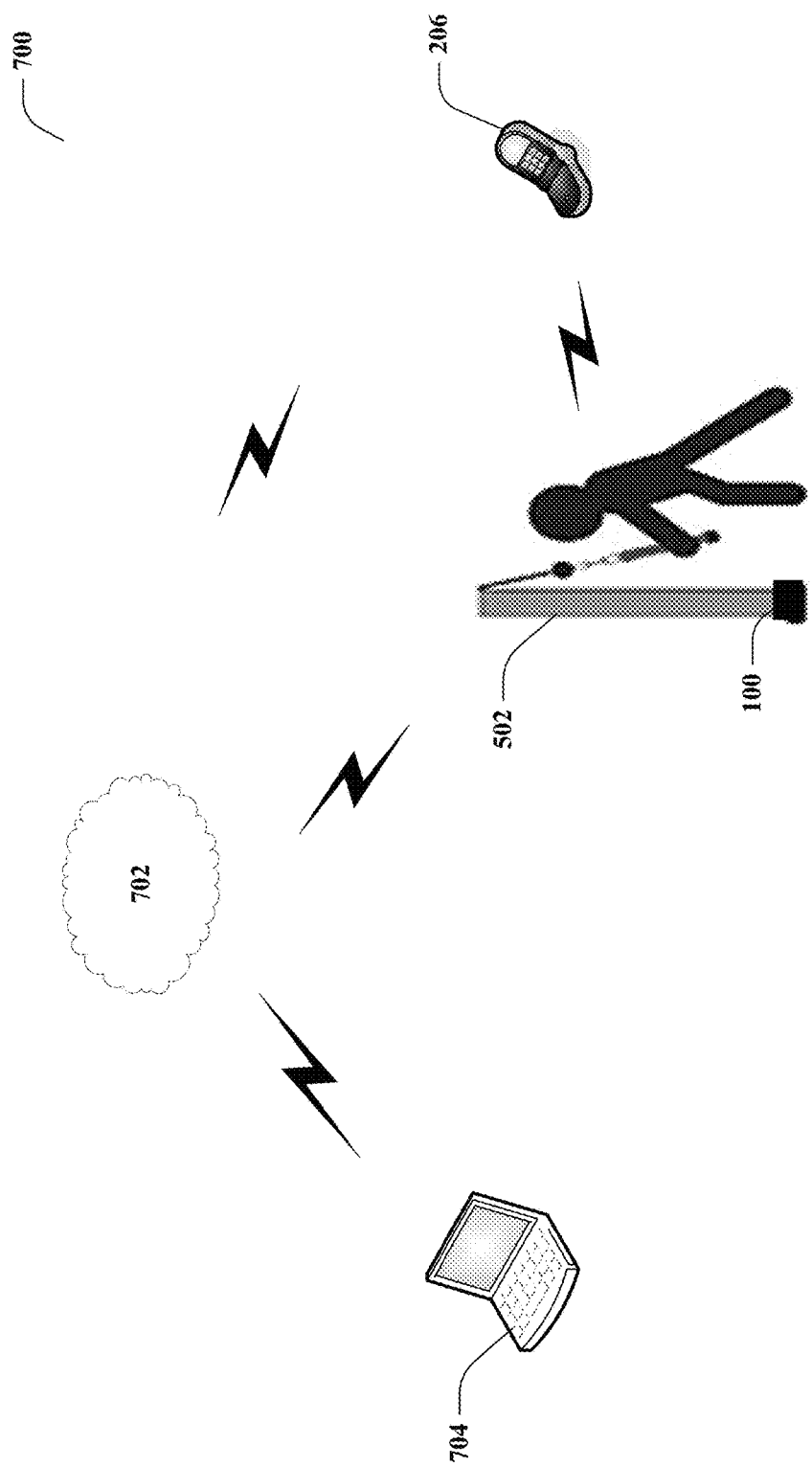
FIG. 7 illustrates an example exercise equipment comprising an exercise metric device in communication with a mobile device and in communication with a wireless network according to one or more embodiments.

Referring now to FIG. 7, illustrated is an example exercise equipment comprising an exercise metric device in communication with a mobile device and in communication with a wireless network according to one or more embodiments. Repetitive description of like elements employed in other embodiments described herein is omitted for sake of brevity. The system 700 can be employed to use hardware and/or software to solve problems that are highly technical in nature, that are not abstract and that cannot be performed as a set of mental acts by a human. Further, some of the processes performed may be performed by a specialized computer for carrying out defined tasks related to memory operations. The system 700 and/or components of the system can be employed to solve new problems that arise through advancements in technology, computer networks, the Internet and the like.

The system 700 can comprise a stationary machine 502 (e.g., cable & pulley, pec deck, calf, leg curl, etc.). The stationary machine 502 can comprise an internal exercise metric device 100, wherein the stationary machine 502 can be built with the exercise metric device 100, or the exercise metric device 100 can be externally attached to the stationary machine 502. The exercise metric device 100 can communicate with a mobile device 206 of the user.

Additionally, the exercise metric device 100 can communicate exercise metrics to a server or a cloud-based device 702 to facilitate external access to the exercise metrics. For instance, a healthcare provider can monitor a user's exercise history from another mobile device 704, which is remotely located from the stationary machine 502. Consequently, the healthcare provider can send exercise regimen data to the stationary machine 502 and/or the mobile device 206 to prompt the user to alter his or her workout regimen in real-time and/or substantially real-time. The exercise regimen data can also comprise an adjustment of weight and/or resistance. For instance, if the healthcare provider's analysis of the exercise metric data indicates that the user is over-exerting himself in light of a recent surgery, the healthcare provider can remotely adjust a weight and/or resistance of the stationary machine 502 via the other mobile device 704. In like manner, the exercise regimen data can be stored at the server or a cloud-based device 702 for future use or download by the user and/or the stationary machine 502.

Figure 8:
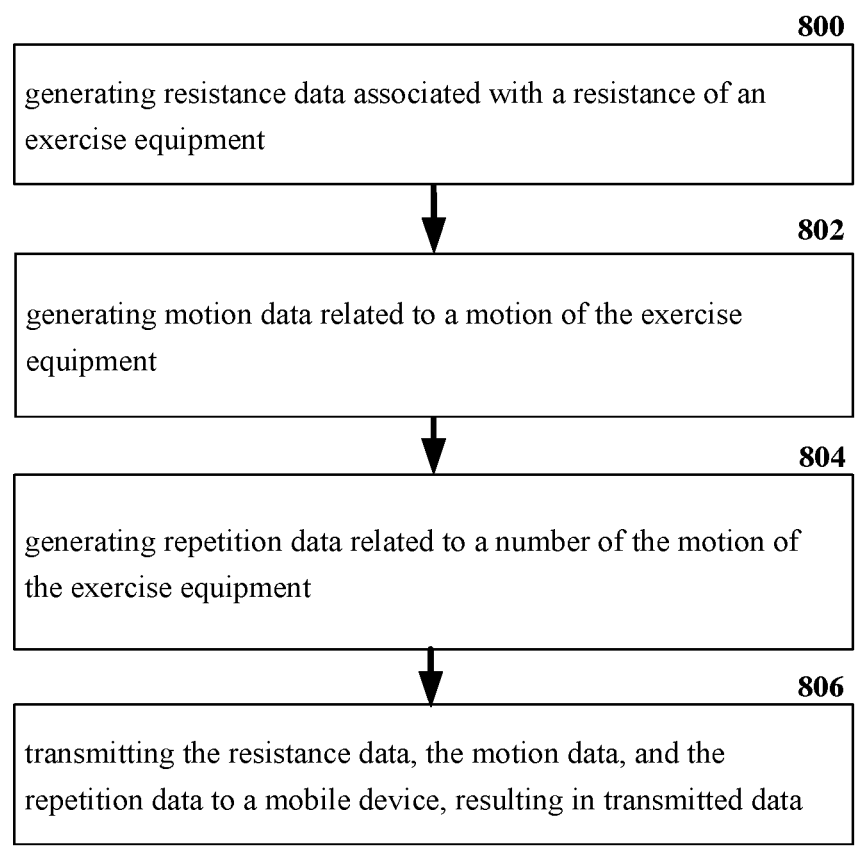
FIG. 8 illustrates an example schematic system block diagram for transmitting data from an exercise metric device according to one or more embodiments.

Referring now to FIG. 8, illustrated is an example schematic system block diagram for transmitting data from an exercise metric device according to one or more embodiments. Repetitive description of like elements employed in other embodiments described herein is omitted for sake of brevity. A method can comprise generating resistance data associated with a resistance of an exercise equipment (e.g., via the resistance adjustment component 102) at element 800, and generating motion data related to a motion of the exercise (e.g., via the accelerometer component 106 and/or the gyroscope component 110) at element 802. The motion data can be used to analyze whether a user is performing exercises using a proper form or within a degree of the proper form. For instance, if a proper curl exercise form ranges between a ninety degree angle and a thirty degree angle of the inner arm, then nonconformance data can be generated and transmitted if the user's form angle is greater than ninety degrees or less than thirty degrees. Additionally, the motion data can be used to determine what type of exercise a user is performing. For instance, the motion data can be used to determine whether the user is performing hammer curls or deltoid raises because hammer curls and deltoid raises require different motions. At element 804, the method can also comprise generating repetition data related to a number of the motion of the exercise equipment (e.g., via the assessment component 108). The repetition data can be used to determine how many repetitions a user has performed with regards to a specific exercise. Consequently, the method can comprise transmitting the resistance data, the motion data, and the repetition data to a mobile device, resulting in transmitted data (e.g., via the communication component 112) at element 806.

Figure 9:
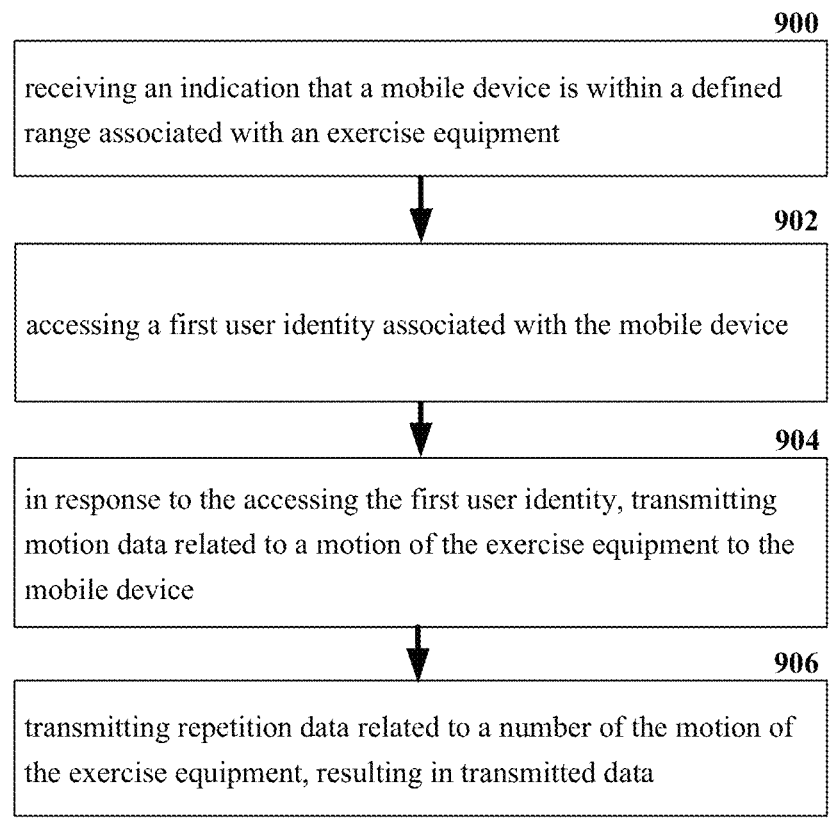
FIG. 9 illustrates an example schematic system block diagram for transmitting data from an exercise metric device according to one or more embodiments.

Referring now to FIG. 9, illustrated is an example schematic system block diagram for transmitting data from an exercise metric device according to one or more embodiments. Repetitive description of like elements employed in other embodiments described herein is omitted for sake of brevity. A system can comprise receiving an indication that a mobile device is within a defined range associated with an exercise equipment (e.g., via the assessment component 108) at element 900. At element 902, the system can access a first user identity associated with mobile device (e.g., via the communication component 112). In response to the accessing the first user identity, the system can transmit motion data related to a motion of the exercise equipment to the mobile device at element 904 (e.g., via the communication component 112, via the accelerometer component 106, and/or the gyroscope component 110), and transmit repetition data related to a number of the motion of the exercise equipment, resulting in transmitted data (e.g., via the communication component 112).

Figure 10:
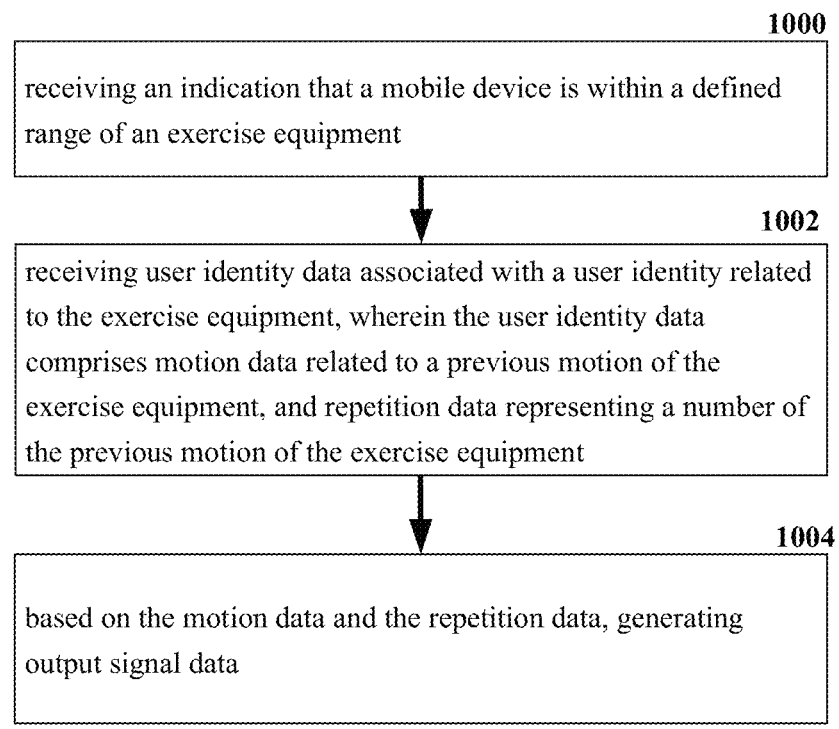
FIG. 10 illustrates an example schematic system block diagram for generating output signal data from an exercise metric device according to one or more embodiments.

Referring now to FIG. 10, illustrated is an example schematic system block diagram for generating output signal data from an exercise metric device according to one or more embodiments. Repetitive description of like elements employed in other embodiments described herein is omitted for sake of brevity. At element 1000, a machine-readable storage medium can comprise receiving an indication that a mobile device is within a defined range of an exercise equipment (e.g., via the communication component 112). At element 1002, the machine-readable storage medium can comprise receiving user identity data associated with a user identity related to the exercise equipment (e.g., via the communication component 112), wherein the user identity data comprises motion data related to a previous motion of the exercise equipment, and repetition data representing a number of the previous motion of the exercise equipment (e.g., via the accelerometer component 106, and/or the gyroscope component 110). Consequently, at element 1004, the machine-readable storage medium can generate output signal data based on the motion data and the repetition data (e.g., via the assessment component 108).

Figure 11:
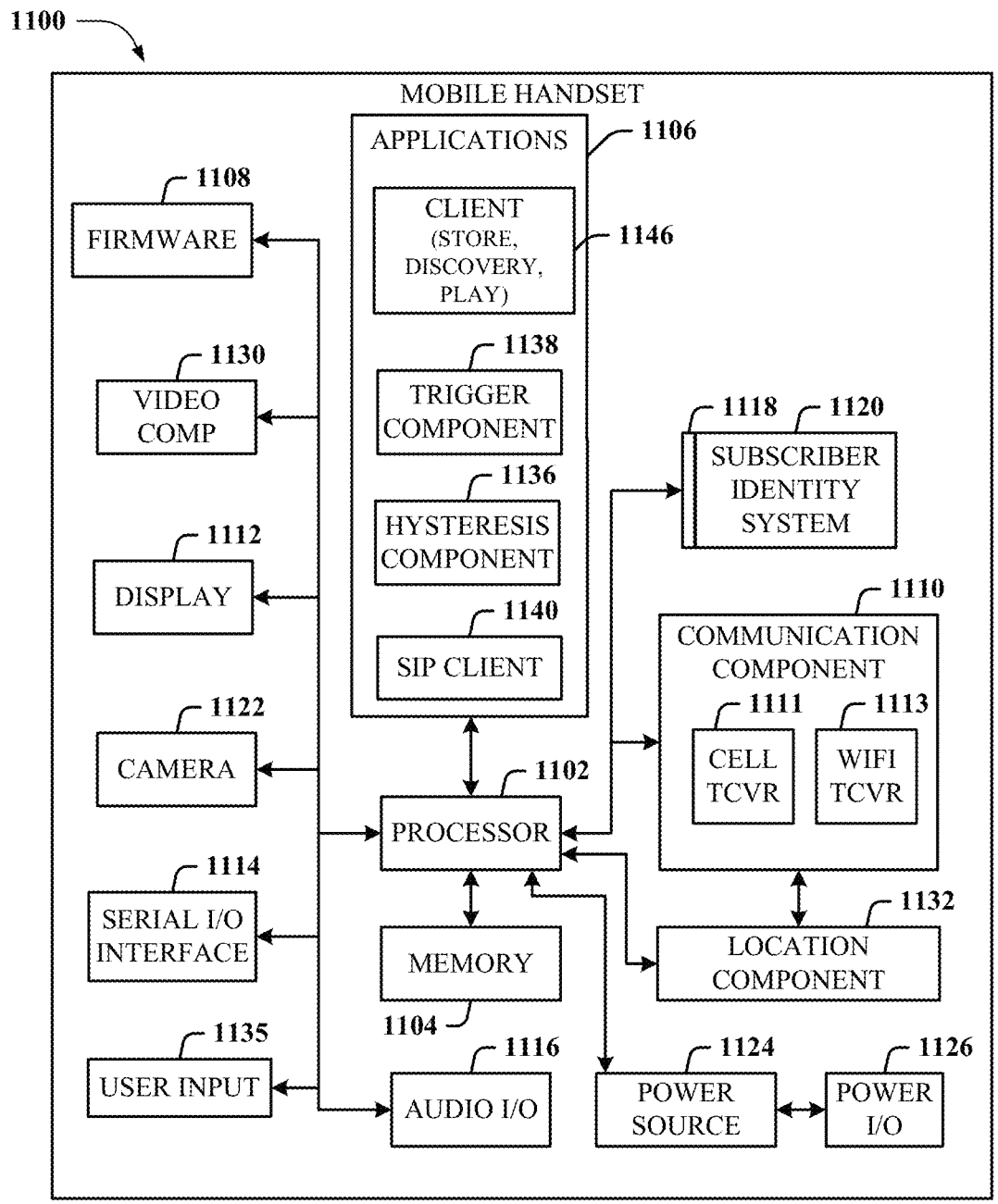
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer. Aspects of systems, apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
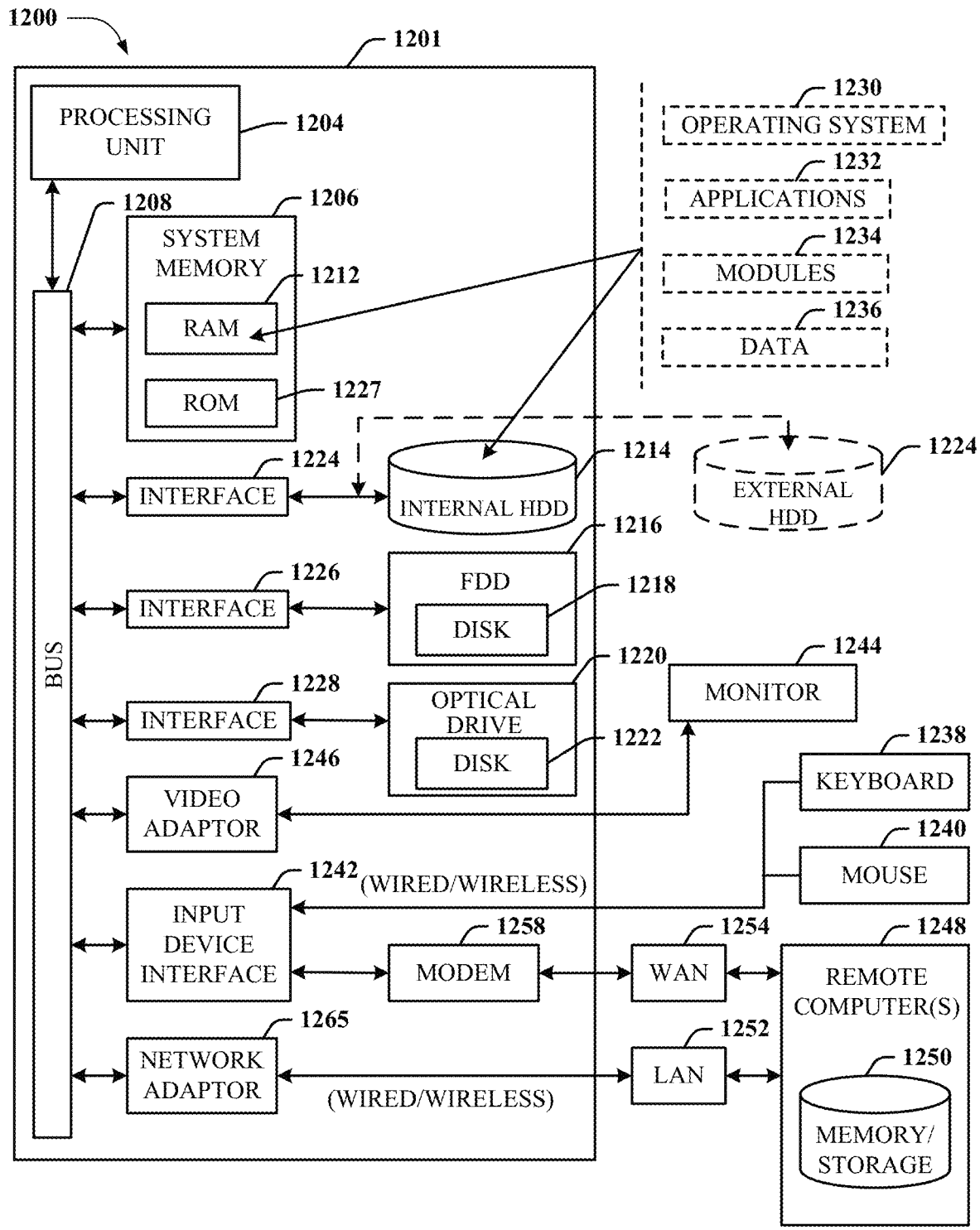
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A machine-readable storage medium, comprising executable instructions that, when executed by a processor, facilitate performance of operations, comprising:
   receiving range data representative of an indication that a first mobile device is within a defined communication range of a network device associated with an exercise equipment;
   in response to the receiving the range data, receiving user identity data associated with a first user identity related to the exercise equipment, wherein the user identity data comprises motion data related to a motion of the exercise equipment, and repetition data representing a number of the motion of the exercise equipment;
   based on the motion data and the repetition data, facilitating generating output signal data to be sent to a second mobile device associated with a second user identity; and
   in response to the facilitating the generating the output signal data, receiving, from the second user identity, nourishment data representing a food or drink to be consumed by a user associated with the first user identity.

2. The machine-readable storage medium of claim 1, wherein the defined communication range is based on a location of the network device relative to other network devices.

3. The machine-readable storage medium of claim 2, wherein the location is a first location, and wherein the defined communication range is further based on a second location of the exercise equipment.

4. The machine-readable storage medium of claim 1, wherein the output signal data comprises text message data representative of a text message.

5. The machine-readable storage medium of claim 1, wherein the repetition data is first repetition data, and wherein the operations further comprise:
   receiving, from the second user identity, second repetition data representing a second number of expected motions associated with the exercise equipment, to be performed by the user.

6. The machine-readable storage medium of claim 1, wherein the generating the output signal data is based on a time difference between a first time associated with the motion and a second time associated with the indication that the first mobile device is within the defined communication range of the exercise equipment.

7. The machine-readable storage medium of claim 1, wherein the operations further comprise:
   generating other repetition data representing another number different from the number of the motion of the exercise equipment.

8. A method, comprising:
   receiving, by a first mobile device comprising a processor, range data representative of a defined range of a communication to facilitate the communication with a wireless network device connected to an exercise equipment;
   in response to an indication that the first mobile device has been determined to have satisfied the defined range, communicating, by the first mobile device, with the wireless network device;
   in response to the communicating, receiving, by the first mobile device, user identity data associated with a first user identity related to the exercise equipment, wherein the user identity data comprises motion data related to a motion of the exercise equipment, and repetition data representing a number of the motion of the exercise equipment;

based on the motion data and the repetition data, generating, by the first mobile device, output signal data to be sent to a second mobile device, associated with a second user identity, for an analysis; and in response to the analysis and the generating the output signal data, receiving, by the first mobile device from the second mobile device, nourishment data representative of nutrition to be consumed by a user associated with the first user identity.

9. The method of claim 8, wherein the defined range of communication is defined by the first mobile device.

10. The method of claim 8, wherein the defined range is based on a preset value received from the first mobile device.

11. The method of claim 10, wherein the repetition data is first repetition data, and further comprising:

receiving, by the wireless network device from the second mobile device, second repetition data to prompt the user associated with the first user identity to perform an action, and wherein the nourishment data comprises hydration data representative of a liquid to hydrate the user associated with the first user identity.

12. The method of claim 8, wherein the output signal data comprises caloric expenditure data representative of a caloric expenditure of a user associated with the first user identity, and wherein the nourishment data is based on the caloric expenditure.

13. A system, comprising:

a processor; and a memory that stores executable instructions that, when executed by the processor, facilitate performance of operations, comprising:

receiving threshold data representative of a threshold distance associated with a communication between a first mobile device and a wireless network device attached to an exercise equipment in response to the threshold distance being determined to have been satisfied, receiving an indication that the first mobile device is communicating with the wireless network device;

receiving user identity data associated with a first user identity related to the first mobile device, wherein the user identity data comprises repetition data representing a number of a motion of the exercise equipment;

based on the number of the motion of the exercise equipment, generating output signal data to be sent to a second mobile device associated with a second user identity; and in response to the generating the output signal data, receiving from the second mobile device, nourishment data representative of nutrition to be consumed by a user associated with the first user identity.

14. The system of claim 13, wherein the operations further comprise:

sending the output signal data to the second mobile device; and in response to the sending the output signal data to the second mobile device, receiving goal data indicative of a goal for the user to undertake.

15. The system of claim 14, wherein the second user identity is associated with a physical therapist, and wherein the operations further comprise:

in response to the sending the output signal data to the second mobile device, receiving goal data indicative of a goal associated with a physical therapy of the user.

16. The system of claim 13, wherein the operations further comprise:

wherein the threshold distance is less than a distance of communication that the wireless network device is capable of, and wherein the communication between the first mobile device and the wireless network device prevents communication between a third mobile device and the wireless network device.

17. The system of claim 13, wherein the second user identity is associated with a healthcare provider.

18. The system of claim 17, wherein the operations further comprise:

in response to the generating the output signal data, receiving, from the healthcare provider, an indication of a reduced healthcare premium.

19. The system of claim 13, wherein the threshold distance is received from a third mobile device to establish the communication between the first mobile device and the wireless network device in accordance with a zone of the exercise equipment.

* * * * *